United States Patent [19]

Love

[11] Patent Number: 4,624,470

[45] Date of Patent: Nov. 25, 1986

[54] MOTORCYCLE STEERING MECHANISM

[76] Inventor: W. Gregory Love, 684 Tantra Dr., Boulder, Colo. 80303

[21] Appl. No.: 778,202

[22] Filed: Sep. 20, 1985

[51] Int. Cl.$^4$ ............................................. B62K 21/02
[52] U.S. Cl. .................................... 280/279; 180/219
[58] Field of Search ............... 280/279, 270, 271, 272, 280/274, 275, 276; 180/219

[56] References Cited

U.S. PATENT DOCUMENTS 642,269 1/1900 Smith .................................. 280/279
4,565,384 1/1986 Dehnisch ........................... 280/279

FOREIGN PATENT DOCUMENTS

Ad.60132 9/1954 France ............................. 280/276
14847 7/1897 Switzerland ..................... 280/271

Primary Examiner—John A. Pekar

[57] ABSTRACT

A steering mechanism for a motorcycle is disclosed. The mechanism includes a steering head assembly and a front steered wheel. A front fork assembly carries the steered wheel of the motorcycle at one end thereof. The front fork assembly is adapted for rotational movement about a generally upright axis to turn the steered wheel. A mechanism is provided for variably controlling the fork angle of the front fork assembly as a function of the turning of the steered wheel.

29 Claims, 6 Drawing Figures

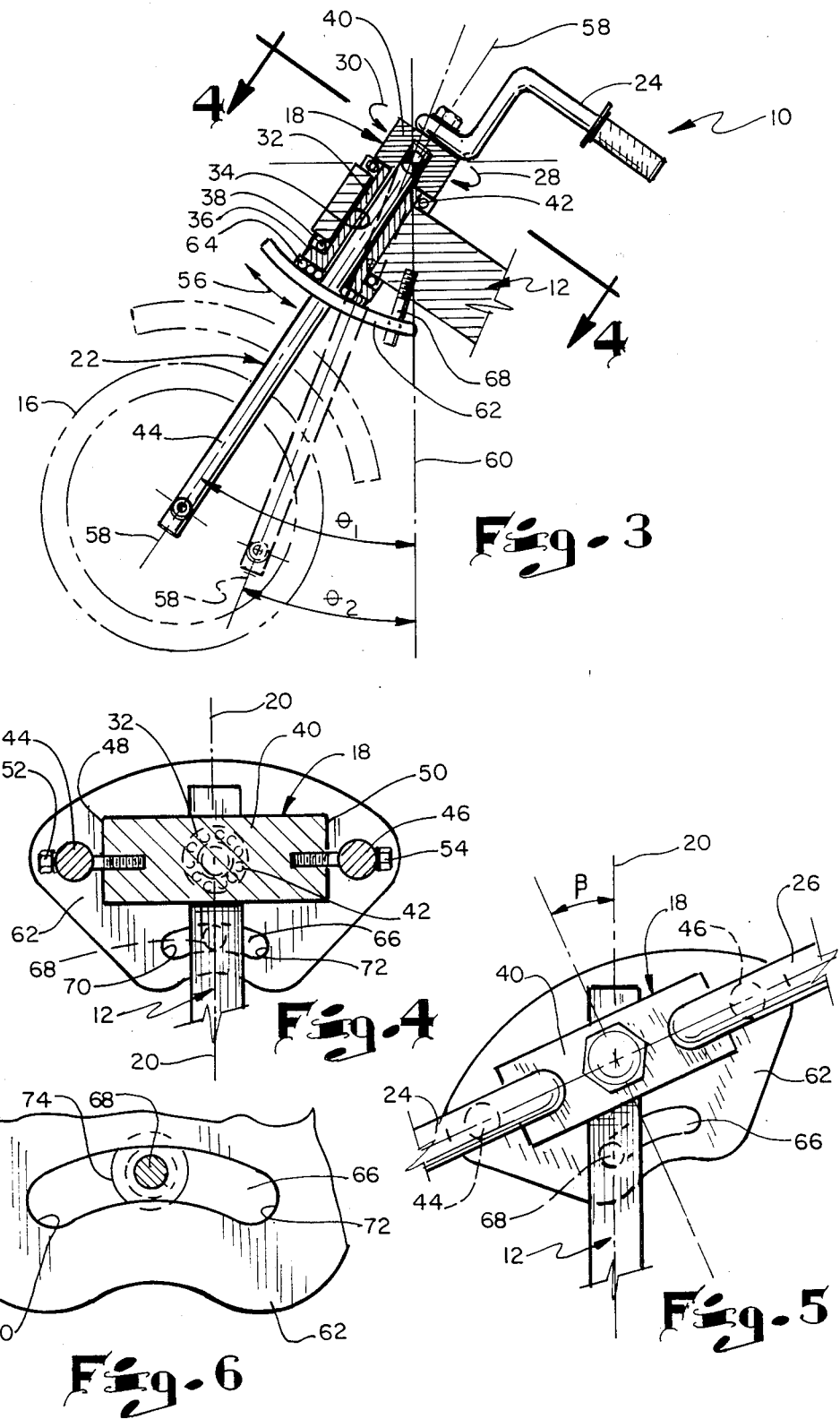

MOTORCYCLE STEERING MECHANISM

BACKGROUND OF THE INVENTION

1. Field of the Invention

The present inventions relates generally to motorcycles and, more particularly, to motorcycle steering mechanisms. Specifically, the present invention relates to an improved motorcycle steering mechanism which permits continuous automatic adjustment of the rake or fork angle of the motorcycle's front wheel during operation thereof.

2. Description of the Prior Art

The steering and stability characteristics of motorcycles, bicycles and other similar types of vehicles can be varied and altered in a number of different ways. One particular design aspect which is important to the steering and stability characteristics of a motorcycle involves the rake and fork angles of the front wheel assembly. The rake angle is defined as that angle which the steering axis of the front wheel assembly of the motorcycle has relative to an imaginary vertical axis or plane. Thus, if an imaginary vertical plane is passed through the steering head assembly of a motorcycle, the rake angle is that angle formed between such plane and the steering axis of the front wheel assembly. The fork angle is defined as the angle which the axis of the front fork assembly has relative to the aforesaid vertical axis or plane. Depending on the design of the motorcycle, the rake and fork angles may or may not be identical. If the steering axis is coaxial with the front fork assembly axis, then the rake and fork angles are always identical. In some motorcycle designs, however, the steering axis is set rearwardly along the motorcycle relative to the front fork assembly axis. In this instance, the rake and fork angles are separate and may therefore by set differently from each other.

Variations in the rake or fork angle of a motorcycle will provide different ride and steering characteristics. In fact, these angles are quite critical to the handling of racing as well as off-road types of motorcycles. Assuming for the moment that the rake and fork angles are identical, if the fork angle is large, such as 35° or so, the motorcycle generally tends to be very stable at high speeds on a straight course but is difficult to steer through bends. On the other hand, if the fork angle is considerably smaller, i.e., approximately 25° or less, the motorcycle steering will be quite sensitive and responsive, but the stability of the motorcycle on a fast straight section of road tends to be considerably less than desirable. Thus, an optimum design for off-road "dirt" motorcycles is to have as small a fork angle as possible, since stability along straight, flat pavement sections is not a significant factor. Likewise, an optimum design for a racing motorcycle for long, straight raceways includes as large a fork angle as possible while providing acceptable steering characteristics as well.

Heretofore, most motorcycle designs have represented a compromise by choosing a fork angle somewhere between the above extremes to achieve acceptable stability as well as turning characteristics. However, certain motorcycle designs have been devised which allow changing of the fork angle depending upon road conditions and motorcycle use. In particular, U.S. Pat. Nos. 3,866,946 and 4,082,307, U.K. Pat. No. 570,439 and Italian Pat. No. 523,424 all disclose various mechanical arrangements which permit the rake or fork angle of the front fork assembly of a motorcycle to be changed. While each of the designs disclosed in these particular patents are specifically different, they all achieve fork angle change basically in the same manner. This manner requires that the motorcycle be stopped, that the operator then disassemble portions of the motorcycle steering head assembly to remove or alter components thereof in order to change the fork angle, and that the operator then reassemble the steering head components with the fork angle at its new position. Should the operator subsequently choose to again change the fork angle due to new road conditions or the like, the same cumbersome and time consuming procedure is required. Thus, while the fork angle of such motorcycle steering mechanism designs is variable, it certainly is not automatically variable nor can it be varied conveniently. Moreover, these designs do not permit variance of the fork angle during actual operation of the motorcycle.

U.S. Pat. No. 4,378,857 discloses another type of steering mechanism design which does permit variance of the fork angle during operation of the motorcycle. In this particular design, the steering head assembly is freely, pivotally movable along the longitudinal axis of the motorcycle and is connected to the rear drive wheel of the motorcycle by a shock absorber mechanism. In this manner, the fork angle will automatically vary during the course of operation of the motorcycle depending upon the acceleration or deceleration of the motorcycle, the roughness of the road terrain and the like. In other words, as the rear wheel of the motorcycle of this particular design bounces vertically or moves longitudinally relative to the front wheel, e.g. during rapid acceleration or deceleration, the fork angle will automatically change. Thus, the variability of the fork angle in this design is dependent entirely on operating and road conditions and in many instances is not under the control of the motorcycle operator. Consequently, there is still a need for a motorcycle steering mechanism design wherein the fork angle can be easily changed as desired by the motorcycle operator to permit larger fork angle adjustments during straight away motorcycle operation and shorter fork angle adjustments during turning and off-road operations.

SUMMARY OF THE INVENTION

Accordingly, it is one object of the present invention to provide an improved motorcycle steering mechanism.

It is another object of the present invention to provide a steering mechanism for a motorcycle which permits automatic and continuous adjustment of the fork angle of the motorcycle independent of road and motorcycle operating conditions.

It is a further object of the present invention to provide a motorcycle steering mechanism adapted to afford a large fork angle during straight-away operation of the motorcycle and a shorter fork angle when the motorcycle is turned.

It is yet another object of the present invention to provide a motorcycle design having substantial stability during straight-away operation yet provide considerable sensitivity and control when turning the motorcycle.

To achieve the foregoing and other objects and in accordance with the purpose of the present invention, a steering mechanism for a motorcycle is provided. The steering mechanism includes a steering head assembly and a front steered wheel. A front fork assembly carries the steered wheel of the motorcycle at one end thereof and is adapted for rotational movement about a generally upright axis to turn the steered wheel. A mechanism is provided for variably controlling the fork angle of the front fork assembly as a function of the turning of the steered wheel.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings in which:

FIG. 3 is an enlarged, side perspective view with some parts in sections, of the front portion of a motorcycle constructed in accordance with the present invention and illustrating fork angle variations achievable thereby;

FIG. 4 is a cross sectional view taken substantially along line 4—4 of FIG. 3;

FIG. 5 is a partial top plan view of the embodiment illustrated in FIG. 3 and similar to that illustrated in FIG. 4 but illustrating the steering head assembly in a turned condition; and FIG. 6 is an enlarged, partial sectional view of an alternate embodiment of the pin and slot assembly of the present invention.

DETAILED DESCRIPTION OF THE PREFERRED EMBODIMENTS

Figure 1:
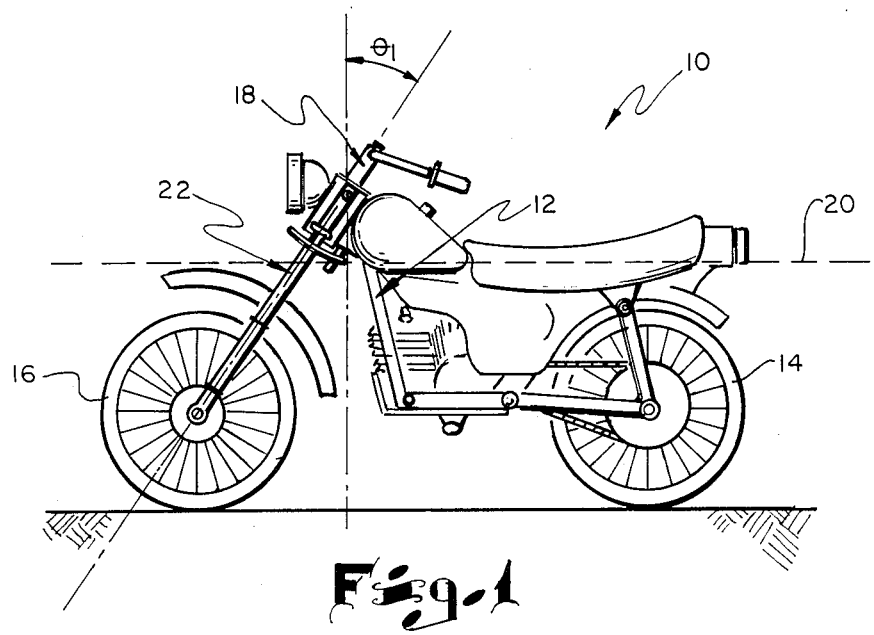
FIG. 1 is a side perspective view of a motorcycle having a steering mechanism constructed in accordance with the present invention and in position for straight-away operation.
Figure 2:
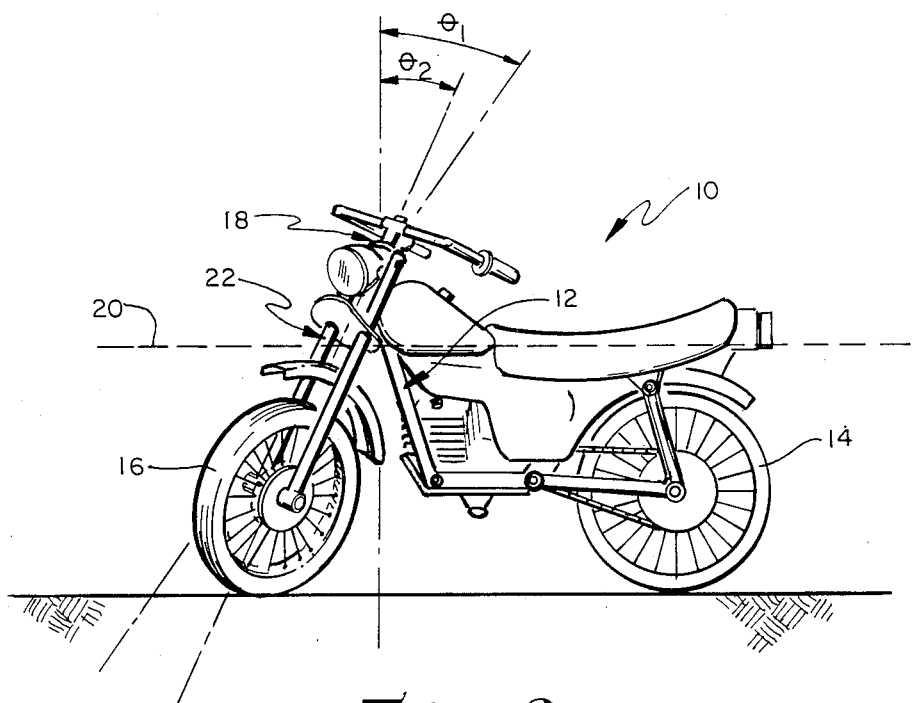
FIG. 2 is a side perspective view similar to that of FIG. 1 but illustrating the steered wheel and steering head assembly in a turned condition with the fork angle reduced thereby.

Referring to the drawings and in particular to FIGS. 1 and 2, a motorcycle 10 is illustrated having a main frame assembly 12, a rear drive wheel 14, a front steered wheel 16 and a steering head assembly 18. Other than as specifically described below relative to the improved steering mechanism of the present invention, the components of the motorcycle 10 are standard and within the state of the art. In FIG. 1, the front steered wheel 16 is aligned along the longitudinal axis 20 of the motorcycle 10 for straight-away operation. The axis 20 of the motorcycle 10 can be more clearly seen in FIGS. 4 and 5. A front fork assembly 22 interconnects the wheel 16 with the steering head assembly 18 and defines a first angle $\theta_1$. In the illustrated embodiment, the front fork assembly axis and the steering axis are the same. Therefore, $\theta_1$ represents both the fork and the rake angles.

In FIG. 2, the steering head assembly 18 has been rotated so as to turn the front steered wheel 16 out of alignment with and angularly away from the longitudinal axis 20 thereby moving the wheel 16 an angular distance from the axis 20. In FIG. 2, it will be noted that the front fork assembly 22 is drawn closer to the frame 12 as the steered wheel 16 is turned thereby forming a new, smaller fork angle $\theta_2$ as compared to the angle $\theta_1$ of the fork assembly 22 of FIG. 1. This will be described in greater detail below.

Referring particularly now to FIGS. 3-5, the front fork assembly 22 interconnects the front steered wheel 16 with the steering head assembly 18 such that the steering head assembly 18 is adapted for rotation relative to the frame 12. The rotation of the steering head assembly 18 is generally controlled by manipulation of a pair of handlebars 24, 26. The arrows 28, 30 illustrate the directions of rotation available to the steering head assembly 18 by manipulation from the handlebars 24, 26. The front fork assembly 22 is preferably interconnected to the steering head assembly 18 so as to rotate therewith to thereby turn the steered wheel 16 away from the longitudinal axis 20 of the motorcycle in either of the two indicated directions.

A wide variety of embodiments and arrangements are possible within the scope of the present invention for the construction of the steering head assembly 18 and the front fork assembly 22. One preferred arrangement for use with the present invention includes a steering head assembly 18 having a central shaft member 32 passing through a bore 34 which is disposed in the forward end of the motorcycle main frame 12. A collar 36 is located at the lower-most end of the shaft 32 and a bearing member 38 is preferably disposed between the collar 36 and the main frame 12. Located at the uppermost portion of the shaft 32 is a head member 40 which is secured for rotation with the shaft 32 within the bore 34. A bearing member 42 is preferably disposed between the head member 40 and the main frame 12. The bearings 38 and 42 assist in the rotation of the steering head assembly 18 relative to the frame 12 within the bore 34. Attached to the upper surface of the head member 40 in any conventional manner are the handlebars 24, 26 which are utilized by the operator of the motorcycle 10 to rotate the steering head assembly 18, the front fork assembly 22 and the wheel 16.

The front fork assembly 22 can also be constructed in a variety of different ways and still remain within the scope of the invention. In one preferred embodiment, the assembly 22 includes a pair of fork tubes or bars 44, 46 which are aligned substantially parallel to each other and interconnect the steered wheel 16 with the steering head assembly 18. In the illustrated embodiment, the bars 44, 46 are secured to either side of the hub of the wheel 16 in conventional fashion and extend upwardly for attachment to the steering head assembly 18. The bars 44, 46 are each pivotally attached to the steering head assembly 18 and preferably to the transverse ends 48, 50 of the head member 40. The tubes 44, 46 are attached to the head 40 by pivot pins 52, 54. In this manner, the front fork assembly 22 along with the steered wheel 16 may be moved along the longitudinal axis 20 of the motorcycle 10 relative to the frame 12 and the steering head assembly 18 as illustrated by the double arrow 56.

Referring specifically to the embodiment of FIG. 3, the front fork assembly axis 58 is identical to the steering axis of the motorcycle. The angle formed between the axis 58 and the vertical line or plane 60 drawn through the front fork assembly 18 pivot point as represented by the pins 52, 54, is the fork angle or rake angle. In the illustrated embodiment, a first fork angle $\theta_1$ is illustrated and represents the fork angle at its maximum extent. This angle is also shown in FIG. 1. Since the front fork assembly 18 may be pivoted about the pins 52, 54 and thereby moved longitudinally along the axis 20, a second fork angle $\theta_2$ is also illustrated showing a second position of the front fork assembly 22 and specifically illustrating the minimum fork angle achievable by the motorcycle 10 in the illustrated embodiment. $\theta_2$ is also shown in FIG. 2 and represents the minimum fork angle at the maximum turn angle $\beta$ of the front wheel 16. As previously discussed, it is highly desirable to have a large fork angle when operating a motorcycle on a flat, straight-away surface, and a small fork angle when maneuvering and turning a motorcycle or operating it on rough terrain, which generally requires many turning maneuvers. In preferred form, $\theta_1$ represents approximately 35° while $\theta_2$ represents approximately 25°. However, the present invention may be constructed so as to preset any desired $\theta_1$ and $\theta_2$ with the front fork assembly 22 movable therebetween as illustrated in FIG. 3.

Continuing to refer to FIGS. 3–5, the fork angle of the motorcycle 10 may be continuously and automatically changed as a direct function of the turning or rotating of the wheel 16 and the front fork assembly 22 by providing a support in the form of a curved plate 62. The plate 62 is secured to the front fork assembly 22 and may be removably mounted to or form an integral part of the front fork assembly 22. In preferred form, the plate 62 is disposed immediately below the collar 36 with a bushing or bearing member 64 positioned between the curved plate 62 and the collar 36 to assist in relative movement therebetween as described below. In preferred form, the plate 62 encloses and is secured to the tubes 44, 46, although the plate 62 may be an integral part thereof as well. Thus, the plate 62 is adapted to move along the longitudinal axis 20 with the front fork assembly 22 as well as to be rotated in association with rotation of the front fork assembly 22 and the steering head assembly 18.

It was conceived that if the fork angle could be decreased upon initiating the turn of the motorcycle 10, then substantial benefits in terms of steering sensitivity and quickness could be achieved without sacrificing straight-away stability. The present invention achieves this function by providing the plate 62 and a tongue and groove arrangement coupling the plate 62 to the frame 12 to control the relative longitudinal and rotational movements of the front fork assembly 22. More specifically, a curved slot 66 is provided in the plate 62, and a large steering pin member 68 projects from the frame 12 through the slot 66 for movement therewithin during turning of the steering head assembly 18. While the slot 66 and the pin 68 may be located as desired, the illustrated embodiment positions this coupling combination behind the shaft 32 of the steering head assembly 18 and below the frame 12. With this configuration, the pin 68 traverses the length of the slot 66 as the steering head assembly 18 and the front fork assembly 22 are rotated about the axis 58 when turning the steered wheel 16. The slot 66 is curved in such a manner so as to draw the tubes 44, 46 toward the vertical line or plane 60 as the steering head assembly 18 and the front fork assembly 22 are rotated away from the longitudinal axis 20. Moreover, the more the assemblies 18 and 22 are rotated so as to increase the angular distance between the steered wheel 16 and the longitudinal axis 20, the more the tubes 44, 46 are drawn toward the vertical 60 so as to decrease the fork angle $\theta$.

The slot 66 is curved and oriented so that when the steered wheel 16 is aligned along the longitudinal axis 20 so as to steer the motorcycle 10 in a straight line, the steering pin 68 is centered within the slot 66 as illustrated in FIG. 4. This arrangement is equivalent to providing a fork angle of $\theta_1$ as illustrated in FIGS. 1 and 3. As the steering head assembly 18 and the front fork assembly 22 are rotated, the pin 68 slides along the slot 66 to reduce the fork angle $\theta$. The ends 70, 72 of the slot 66 act as stops to prohibit further movement of the pin 68 and thereby further turning of the steering head assembly 18. When the pin 68 has reached either of the ends 70, 72, as illustrated in FIG. 5, the fork angle $\theta_2$ is achieved which is the minimum fork angle available for the motorcycle 10.

In a preferred form of the invention, the plate 62 is removably mounted to the front fork assembly 22 so that a variety of plates 62 may be interchangeably mounted to any given motorcycle 10, with each plate 62 having a somewhat different sized and/or shaped slot 66. As is clear from the above description, depending upon the size as well as the shape and angular radius of the curved slot 66, the fork angle variations achievable by turning the steering head assembly 18 and the front fork assembly 22 can be varied as desired. However, once a particular plate 62 with a set slot 66 configuration is mounted to the motorcycle 10, then the fork angle variations available during operation of the motorcycle 10 become set and predetermined. Thus, as the operator of the motorcycle 10 steers the vehicle and turns the steered wheel 16, the fork angle $\theta$ will automatically and continuously vary as a direct function of the steering of the motorcycle 10, and these variations are predetermined by the configuration of the slot 66. As a result, the fork angle changes and variations are within the complete control of the operator of the motorcycle 10 and are entirely independent of any road condition or vehicle operating condition (except turning) such as speed, acceleration or the like. Moreover, since it is desirable to have a smaller fork angle when turning the motorcycle 10, the more the steering head assembly 18 and the front fork assembly 22 are rotated away from the longitudinal axis 20, the smaller the fork angle which is provided thereby increasing sensitivity and responsiveness as the motorcycle wheel 16 is turned further away from the longitudinal axis 20. On the other hand, if the motorcycle 10 is driven in a straight-away manner, the fork angle is at its maximum, thereby providing maximum stability for the motorcycle 10.

Referring now to FIG. 6, another embodiment of the present invention provides a roller bearing 74 disposed about the pin member 68 at the intersection of the pin 68 and the slot 66. The bearing 74 is adapted for movement within the slot 66, while the pin 68 may move longitudinally within the bearing 74. The purpose of the bearing 74 is to reduce stress on the pin 68 and to limit and reduce possible wearing thereof as it moves within the slot 66.

As can be seen from the above, the combination of the coupling provided by the pin member 68 and the slot 66 in conjunction with the pivot mounting of the front fork assembly 22 to the steering head assembly 18 provides automatic and continuous changing of the fork angle while steering the motorcycle 10. Since the fork angle is very critical to the handling of a motorcycle, the arrangement afforded by the present invention permits maximum stability when driving the motorcycle in a straight line yet provides maximum sensitivity and responsiveness when turning the motorcycle. This is a significant advantage over prior motorcycle steering designs which have generally beeen a compromise of these two factors or, if the fork angle was variable, required that the motorcycle be stopped and partially dismantled in some form in order to vary the fork angle characteristics of the motorcycle. Moreover, once the fork angle was so varied in such prior designs, it was permanent until the operator stopped the vehicle and made another fork angle change thereto. With the present invention, the fork angle is continuously and variably changeable according to the desires and steering needs of the motorcycle operator. Moreover, the present invention is readily adaptable to many motorcycle designs since the location of the front fork assembly hinge mount as well as the location of the coupling mechanism may be varied as desired. By altering the slot location and configuration, the handling of the motorcycle can be fine tuned according to the particular operator's preference as well as the anticipated riding conditions.

It will be understood that the invention may be embodied in other specific forms not departing from the spirit or central characteristics thereof. The present examples and embodiments, therefore, are to be considered in all respects as illustrative and not restrictive, and the invention is not to be limited to the details given herein but may be modified within the scope of the appended claims.

I claim:

1. A steering mechanism for a motorcycle or other wheeled vehicle comprising:
   a rotatable steering head assembly;
   a front steering wheel;
   a front fork assembly interconnecting said steering head assembly and said steered wheel such that rotation of said steering head assembly causes a concomitant turning of said steered wheel and said front fork assembly, said front fork assembly carrying said steered wheel at one end thereof and adapted for rotational movement about a generally upright axis to turn said steered wheel; and
   means for variably controlling the fork angle of said front fork assembly as a function of the turning of said steered wheel.

2. The steering mechanism as claimed in claim 1, wherein said variable control means includes means for continuously and automatically varying said fork angle as a function of the angular distance said steered wheel is rotated away from the longtitudinal axis of said motorcycle.

3. The steering mechanism as claimed in claim 1, wherein said motorcycle includes a main frame portion carrying said steering head assembly, said front fork assembly being adapted for rotational movement about its axis relative to said main frame portion, and wherein said variable control means comprises coupling means interconnecting said main frame portion and said front fork assembly to control and limit the amount of angular movement of said front fork assembly as it rotates about its axis while simultaneously adjusting the fork angle at variable predetermined amounts relative to said front fork assembly rotational movement.

4. The steering mechanism as claimed in claim 3, wherein said coupling means comprises a tongue and groove assembly, the length and shape of said groove defining said predetermined fork angle amounts.

5. The steering mechanism as claimed in claim 4, wherein said tongue comprises a pin member integral with and projecting from said main frame portion, and wherein said front fork assembly includes a support member secured for rotational movement therewith and including said groove therein, said groove being angular in shape and oriented to decrease the fork angle as the angular distance between the steered wheel and the longitudinal axis of said motorcycle is increased.

6. The steering mechanism as claimed in claim 1, wherein said variable control means includes said front fork assembly pivotably connected to said steering head assembly.

7. The steering mechanism as claimed in claim 6, wherein said front fork assembly comprises a pair of substantially parallel bars aligned along said generally upright axis and connected at one end to the hub of said steered wheel and at their opposite ends to said steering head assembly.

8. The steering mechanism as claimed in claim 7, wherein said motocycle includes a main frame member with said steering head assembly and said front fork assembly being adapted for simultaneous rotation along said generally upright axis relative to said main frame member to turn said steered wheel, and wherein said variable control means comprises a support member interconnecting said bars and adapted for rotational movement therewith, and coupling means interconnecting said main frame member and said support member to limit the angular rotatational movement of said front fork assembly while simultaneously adjusting the fork angle at variable predetermined amounts relative to the rotational movement of said front fork assembly.

9. The steering mechanism as claimed in claim 8, wherein said coupling means comprises a tongue and groove assembly interconnecting said main frame member and said support member.

10. The steering mechanism as claimed in claim 9, wherein said tongue comprises a pin member integral with and projecting from said main frame member, and said support member comprises a plate with said groove being in the form of a slot disposed in said plate, said pin projecting through said slot for sliding movement therewithin.

11. The steering mechanism as claimed in claim 10, wherein said slot is configured to reduce said fork angle as the rotational angle of said steered wheel is increased away from the longitudinal axis of said motorcycle.

12. The steering mechanism as claimed in claim 10, wherein said pin includes a bearing disposed thereabout to aid in movement of said pin within said slot.

13. The steering mechanism as claimed in claim 1, wherein said fork angle is variable between 35° and 25°.

14. A steering mechanism for a motorcycle or other wheeled vehicle comprising:
   a rotatable steering head assembly;
   a front steering wheel;
   a front fork assembly carrying a steered wheel of said motorcycle and interconnecting said steering head assembly and said steered wheel such that rotation of said steering head assembly causes a concommitant turning of said steered wheel and said front fork assembly; and
   means for automatically varying the fork angle of said front fork assembly a predetermined amount as a function of the turning of said steered wheel.

15. The steering mechanism as claimed in claim 14, wherein said automatic varying means includes means for continuously varying said fork angle as an inverse function of the angular distance said steered wheel is turned away from the longitudinal axis of said motorcycle.

16. The steering mechanism as claimed in claim 15, wherein said motorcycle includes a main frame portion, wherein said steering head assembly and said front fork assembly are mounted for simultaneous rotation about a generally upright axis to turn said steered wheel a measured angular amount away from the longitudinal axis of said motorcycle, and wherein said automatic varying means comprises coupling means interconnecting said main frame portion and said front fork assembly to limit the amount of angular movement of said front fork assembly as it rotates about its axis while simultaneously adjusting the fork angle in variable predetermined amounts as a function of said rotational movement.

17. The steering mechanism as claimed in claim 16, wherein said coupling means comprises a tongue and groove arrangement interconnecting said front fork assembly with said main frame portion.

18. A steering mechanism as claimed in claim 17, wherein said tongue and groove arrangement comprises a plate member mounted for rotation with said front fork assembly and including said groove in the form of a slot disposed therein, and a pin projecting from said frame member and passing through said slot to control the movement of said front fork assembly along the axis of said motorcycle as a front fork assembly is rotated.

19. The steering mechanism as claimed in claim 17, wherein said groove is sized and shaped so as to decrease said fork angle as the angular distance said steered wheel is increased away from the longitudinal axis of said motorcycle.

20. In a motorcycle or other wheeled vehicle having a main frame, a rotatable steering head assembly connected to said main frame, a front steered wheel for turning the motorcycle, a rear drive wheel connected to said main frame, and a front fork assembly interconnecting said steering wheel with said steering head assembly and adapted for rotation about a generally upright steering axis in conjunction with steering head assembly to turn said steered wheel away from the longitudinal axis of said main frame, the improvement comprising means for automatically variably controlling the fork angle of said front fork assembly substantially independently of any suspension system for permitting and dampening movement between said main frame and either said front steered wheel or said rear drive wheel.

21. The improvement as claimed in claim 20, wherein said variable control means includes means for continuously varying said fork angle as a function of the angular turning of said steered wheel relative to the longitudinal axis of said main frame.

22. The improvement as claimed in claim 20, wherein said variable control means comprises coupling means interconnecting said main frame with said front fork assembly to enable simultaneous change of said fork angle while rotating said front fork assembly.

23. The improvement as claimed in claim 22, wherein said coupling means comprises a tongue and groove assembly, the size and shape of said groove defining the fork angle adjustments as said front fork assembly is rotated.

24. The improvement as claimed in claim 23, wherein said coupling means further comprises a curved plate secured to said front fork assembly for rotation therewith, said plate including said groove in the form of a slot disposed therein, and said tongue comprising a pin projecting from said main frame through said slot for controlling and limiting the rotational angular movement of said front fork assembly.

25. The improvement as claimed in claim 20, wherein said front fork assembly is hingedly connected to said steering head assembly for pivotal movement along said main frame longitudinal axis to permit variable adjustment of said fork angle.

26. A mechanism for varying the fork angle of the front fork assembly of a motorcycle or other wheeled vehicle having a main frame member, said mechanism comprising means for coupling said main frame member with said front fork assembly to automatically vary said fork angle as a function of rotating the front fork assembly when steering said motorcycle.

27. The mechanism as claimed in claim 26, wherein said coupling means is adapted to interconnect said main frame member with said front fork assembly to permit simultaneous change of said fork angle while rotating said front fork assembly.

28. The mechanism as claimed in claim 26, wherein said coupling means comprises a tongue and groove assembly with the size and shape of said groove defining the fork angle adjustments as said front fork assembly is rotated.

29. The mechanism as claimed in claim 28, wherein said front fork assembly is hinged for pivotal movement along the longitudinal axis of said main frame member, and wherein said coupling means includes a support plate secured to said front fork assembly for longitudinal and rotational movement therewith, said groove being disposed in said plate and said tongue comprising a pin member projecting from said main frame member through said groove to couple said main frame member to said plate while permitting relative movement therebetween as defined by the size and shape of said groove.

* * * * *